United States Patent
Luobikis et al.

(10) Patent No.: US 11,745,900 B2
(45) Date of Patent: Sep. 5, 2023

(54) HEALTH MONITORING SYSTEM OF AN AIRCRAFT EVACUATION SYSTEM

(71) Applicant: GOODRICH CORPORATION, Charlotte, NC (US)

(72) Inventors: Scott A. Luobikis, Phoenix, AZ (US); Elangovan Palaniappan, Bangalore (IN); Petchi Subramanian, Bangalore (IN)

(73) Assignee: GOODRICH CORPORATION, Charlotte, NC (US)

( * ) Notice: Subject to any disclaimer, the term of this patent is extended or adjusted under 35 U.S.C. 154(b) by 402 days.

(21) Appl. No.: 16/774,905

(22) Filed: Jan. 28, 2020

(65) Prior Publication Data
US 2021/0122499 A1    Apr. 29, 2021

(30) Foreign Application Priority Data

Oct. 25, 2019  (IN) .............................. 201911043461

(51) Int. Cl.
| | |
|---|---|
| *B64F 5/40* | (2017.01) |
| *B64D 25/14* | (2006.01) |
| *B64D 45/00* | (2006.01) |
| *G06Q 10/00* | (2012.01) |
| *B64F 5/60* | (2017.01) |
| *G06Q 10/20* | (2023.01) |

(52) U.S. Cl.
CPC ................ *B64F 5/60* (2017.01); *B64D 25/14* (2013.01); *B64D 45/00* (2013.01); *G06Q 10/20* (2013.01); *B64D 2045/0085* (2013.01)

(58) Field of Classification Search
None
See application file for complete search history.

(56) References Cited

U.S. PATENT DOCUMENTS

| | | | | |
|---|---|---|---|---|
| 5,578,993 | A * | 11/1996 | Sitabkhan | ............... A62C 37/50 340/592 |
| 5,738,303 | A * | 4/1998 | Hamatani | ............... B64D 25/14 244/905 |

(Continued)

FOREIGN PATENT DOCUMENTS

CA        3051331 A1 *   5/2020   ............... B64C 1/14

OTHER PUBLICATIONS

European Patent Office, European Search Report dated Jul. 5, 2021 in Application No. 21152831.0.

*Primary Examiner* — Abdhesh K Jha
(74) *Attorney, Agent, or Firm* — SNELL & WILMER L.L.P.

(57) ABSTRACT

An evacuation system health monitoring system for use on an aircraft is disclosed herein. The system comprises a digital pressure sensor, an evacuation system readiness device, and a memory. The digital pressure sensor is in electronic communication with a controller. The system may further comprise a customer system in communication with the controller. The customer system may communicate a pressure data from the digital pressure sensor to a customer device in real-time during an aircraft flight. The evacuation system readiness device may be in electronic communication with the controller. The evacuation system readiness device may be configured to display a visual indication of system readiness based on operations of the controller.

17 Claims, 6 Drawing Sheets

(56) References Cited

U.S. PATENT DOCUMENTS

| | | | | |
|---|---|---|---|---|
| 6,443,259 B1* | 9/2002 | Oney | ...... | B64D 25/14 |
| | | | | 182/48 |
| 7,490,795 B2* | 2/2009 | Clegg | ...... | F16K 31/122 |
| | | | | 244/905 |
| 7,891,435 B2* | 2/2011 | McSheffrey | ...... | A62C 13/76 |
| | | | | 340/552 |
| 9,751,635 B2* | 9/2017 | Heuer | ...... | B64D 45/00 |
| 10,322,812 B2* | 6/2019 | Knijnenburg | ...... | B64D 45/00 |
| 2006/0144997 A1 | 7/2006 | Schmidt et al. | | |
| 2015/0097083 A1* | 4/2015 | Fellmann | ...... | B64D 9/00 |
| | | | | 244/137.2 |
| 2017/0327237 A1 | 11/2017 | Saini et al. | | |
| 2019/0069053 A1* | 2/2019 | Laguduwa | ...... | H04Q 9/00 |
| 2019/0257710 A1* | 8/2019 | Fages | ...... | F17C 1/00 |
| 2020/0174434 A1 | 6/2020 | Palaniappan | | |
| 2020/0307824 A1 | 10/2020 | Georgin | | |

* cited by examiner

HEALTH MONITORING SYSTEM OF AN AIRCRAFT EVACUATION SYSTEM

CROSS REFERENCE TO RELATED APPLICATIONS

This application claims priority to and benefit of India Patent Application No. 201911043461 titled, "HEALTH MONITORING SYSTEM OF AN AIRCRAFT EVACUATION SYSTEM" filed, Oct. 25, 2019. All of the contents of the previously identified application are hereby incorporated by reference for any purpose in their entirety.

FIELD

The present disclosure relates to aircraft systems and, in particular, to systems health monitoring of an evacuation system.

BACKGROUND

Emergency evacuation systems may be used to exit an aircraft absent a jet way or other suitable means of egress for passengers. The evacuation system may deploy from the side of an aircraft fuselage, for example through a compartment assembly having a blowout panel and a packboard. Deploying an aircraft emergency evacuation system utilizes an inflation gas having a mixture of carbon dioxide ($CO_2$) and nitrogen ($N_2$). The inflation gas is stored in a reinforce pressure vessel (cylinder) equipped with a regulated discharge (regulator) valve. The charged cylinder assembly stores and discharges a compressed gas on command. If the gas pressure in the cylinder is below a threshold limit, a slide of the evacuation system may not inflate and/or become unusable. Monitoring a gas pressure in the cylinder may be a manual process by maintenance after an aircraft lands. As such, addressing a gas pressure issue may take additional time and result in a delayed flight.

SUMMARY

A method of monitoring an evacuation system of an aircraft is disclosed herein. The method may comprise: receiving, by a processor, a current pressure reading of a pressure cylinder assembly from a digital pressure sensor; determining, by the processor, a total in-service time of the pressure cylinder assembly; and generating, by the processor, an alert selected from a group consisting of service due now, service due soon, and evacuation system ready.

In various embodiments, the alert may be a service due now when the total in-service time exceeds a service time threshold or when the current pressure reading is less than a minimum pressure threshold for the pressure cylinder assembly. The alert may be service due soon when the total in-service time is within a near service threshold of the service time threshold. The method may further comprise storing, by the processor, the total in-service time and the current pressure reading resulting in a pressure data as a function of time. The method may further comprise determining, by the processor, an average rate of pressure decreasing over time based on the pressure data. The method may further comprise calculating, by the processor, an expected service date based on the average rate of pressure decreasing over time and the minimum pressure threshold for the pressure cylinder assembly. The alert may be generated on an evacuation readiness device comprising a visual indication of system readiness, wherein service due now is displayed as a first color, wherein service due soon is displayed as a second color, and wherein evacuation system ready is displayed as a third color, wherein the first color, the second color, and the third color are all different.

An evacuation system health monitoring system for use on an aircraft is disclosed herein. The system may comprise: a digital pressure sensor in electronic communication with a controller; an evacuation system readiness device in electronic communication with the controller; and a tangible, non-transitory memory configured to communicate with the controller, the tangible, non-transitory memory having instructions stored thereon that, in response to execution by the controller, cause the controller to perform operations comprising: receiving, by the controller, a current pressure reading of a pressure cylinder assembly from the digital pressure sensor; determining, by the controller, a total in-service time of the pressure cylinder assembly; and generating, by the controller, an alert selected from a group consisting of service due now, service due soon, and evacuation system ready.

In various embodiments, the alert may be service due now when the total in-service time exceeds a service time threshold or when the current pressure reading is less than a minimum pressure threshold for the pressure cylinder assembly. The alert may be service due soon when the total in-service time is within a near service threshold of the service time threshold. The operations may further comprise storing, by the controller, the total in-service time and the current pressure reading resulting in a pressure data as a function of time. The operations may further comprise determining, by the controller, an average rate of pressure decreasing over time based on the pressure data. The operations may further comprise calculating, by the controller, an expected service date based on the average rate of pressure decreasing over time and the minimum pressure threshold for the pressure cylinder assembly. The alert may be generated on the evacuation system readiness device, wherein the evacuation system readiness device further comprises a visual indication of system readiness, wherein service due now is displayed as a first color, wherein service due soon is displayed as a second color, and wherein evacuation system ready is displayed as a third color, wherein the first color, the second color, and the third color are all different.

An article of manufacture including a tangible, non-transitory computer-readable storage medium having instructions stored thereon that, in response to execution by a processor, cause the processor to perform operations is disclosed herein. The operations may comprise: receiving, by the processor, a current pressure reading of a pressure cylinder assembly from a digital pressure sensor; determining, by the processor, a total in-service time of the pressure cylinder assembly; and generating, by the processor, an alert selected from a group consisting of service due now, service due soon, and evacuation system ready.

In various embodiments, the alert is service due now when the total in-service time exceeds a service time threshold or when the current pressure reading is less than a minimum pressure threshold for the pressure cylinder assembly. The alert may be service due soon when the total in-service time is within a near service threshold of the service time threshold. The operations may further comprise storing, by the processor, the total in-service time and the current pressure reading resulting in a pressure data as a function of time. The operations may further comprise: determining, by the processor, an average rate of pressure decreasing over time based on the pressure data; and calculating, by the processor, an expected service date based on the average rate of pressure decreasing over time and the minimum pressure threshold for the pressure cylinder assembly. The alert may be generated on an evacuation readiness device comprising a visual indication of system readiness, wherein service due now is displayed as a first color, wherein service due soon is displayed as a second color, and wherein evacuation system ready is displayed as a third color, wherein the first color, the second color, and the third color are all different.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures but may not be necessarily be repeated herein for the sake of clarity.

As used herein, "proximal" and/or "proximate" refers to a direction inward, or generally, towards the reference component.

A health monitoring system for monitoring a gas cylinder pressure in real time during in-flight is disclosed herein. The health monitoring system may allow a customer to recognize an issue with a gas cylinder of an evacuation system in-flight and address the issue prior to the next flight of an aircraft. By enabling in-flight analysis of a pressure data of an aircraft, an Aircraft on Ground (AOG) situation may be avoided because maintenance teams may address an evacuation system issue immediately upon an aircraft landing without having to wait and find out about an issue via manual inspection. Additionally, a visible indicator on a display system for a health monitoring system is disclosed herein. The visible indicator may allow a user to determine system readiness, whether service is needed soon, and/or whether service is due immediately.

Figure 1:
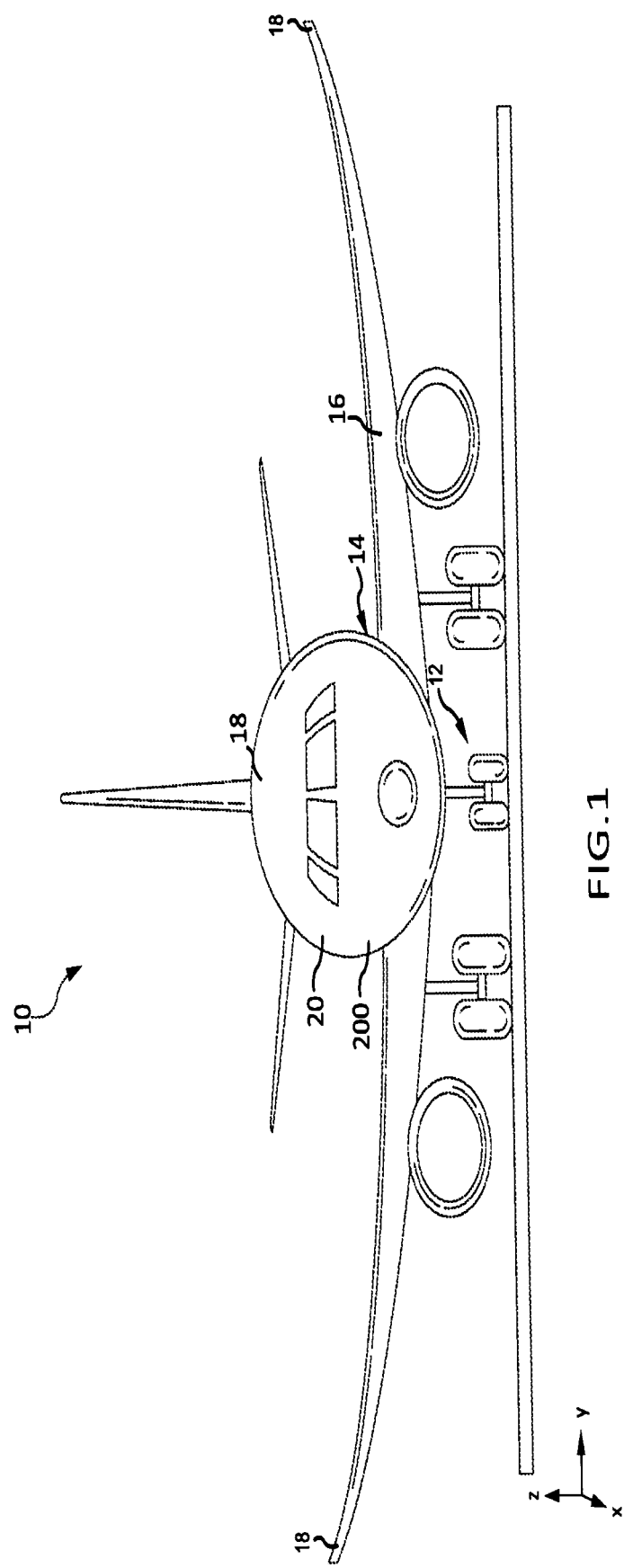
FIG. 1 illustrates an aircraft, in accordance with various embodiments.

With reference to FIG. 1, an aircraft 10 in accordance with various embodiments may comprise aircraft systems, for example, one or more landing gear such as landing gear 12, which may generally support aircraft 10 when aircraft is not flying, allowing aircraft 10 to taxi, take off, and land without damage. Aircraft 10 may include an evacuation system 14 disposed proximate a wing 16. In various embodiments, aircraft 10 may include an evacuation system health monitoring system 200 in communication with the evacuation system 14.

Figure 2:
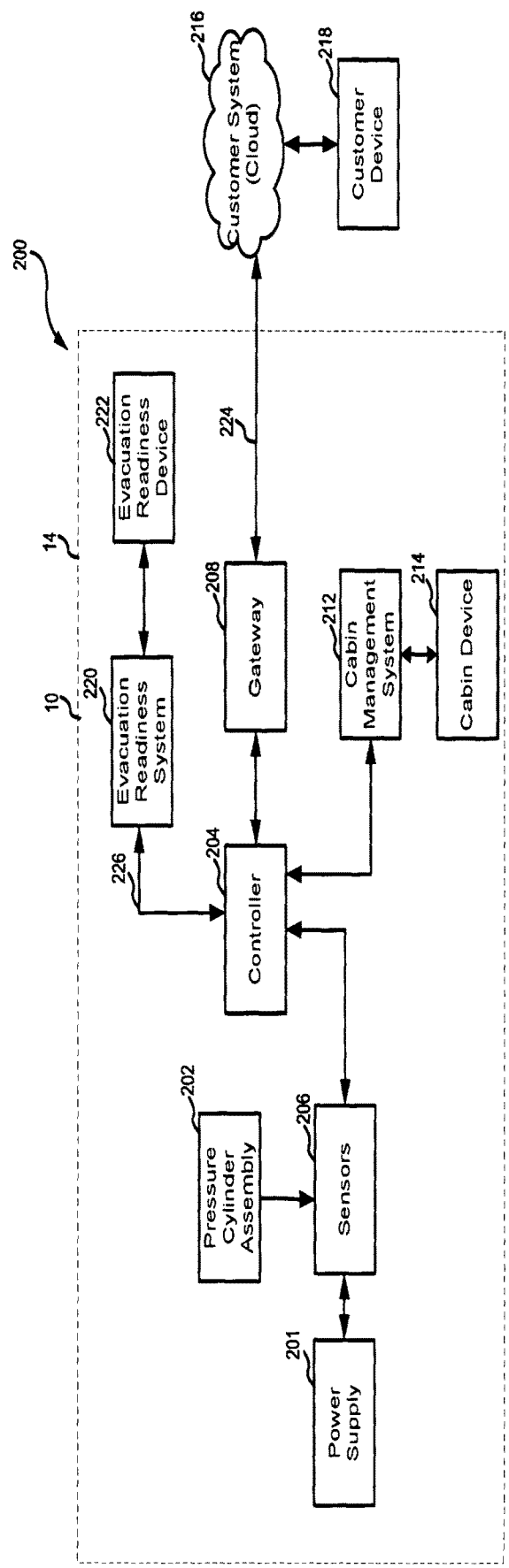
FIG. 2 illustrates a block diagram of an evacuation system health monitoring system, in accordance with various embodiments.

In various embodiments and with additional reference to FIG. 2, a block diagram for an evacuation system health monitoring system 200 of aircraft 10 is illustrated. System 200 includes a power supply 201, a pressure cylinder assembly 202, a controller 204, sensors 206, a network gateway 208, a cabin management system 212, a cabin device 214, a customer system 216, a customer device 218, an evacuation readiness system 220, and an evacuation readiness device 222.

Controller 204 may comprise at least one computing device in the form of a computer or processor, or a set of computers/processors, although other types of computing units or systems may be used. In various embodiments, controller 204 may be implemented as and may include one or more processors and/or one or more tangible, non-transitory memories and be capable of implementing logic. Each processor may be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 204 may comprise a processor configured to implement various logical operations in response to execution of instructions, for example, instructions stored on a non-transitory, tangible, computer-readable medium configured to communicate with controller 204. In various embodiments, controller 204 may be integrated into computer systems onboard an aircraft, such as, for example a flight control system. In various embodiments, controller 204 may be integrated with sensors, such as sensors 206.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Controller 204 may be in electronic communication with power supply 201, sensors 206, network gateway 208, cabin management system 212, cabin device 214, customer system 216, customer device 218, evacuation readiness system 220, and evacuation readiness device 222. Sensors 206 may be coupled to or in electronic communication with various systems of aircraft 10 and may be configured to transmit measurements to controller 204, thereby providing sensor feedback about the evacuation system to controller 204. The sensor feedback may be, for example, a pressure signal (e.g., current cylinder pressure, or the like), or safing pin status feedback, and/or other data. Sensors 206 may comprise a digital pressure sensor, a safing pin sensor, and/or any other sensor known in the art. The digital pressure sensor may be any digital pressure sensor known in the art. In various embodiments, digital pressure sensor of sensors 206 may report pressure reading of evacuation system 14.

In various embodiments, controller 204 may be in electronic communication with a cabin crew of an aircraft through a cabin management system 212. The cabin management system 212 may be in electronic communication with a cabin device 214, such as, for example, a display device in a cabin of the aircraft 10. The cabin device 214 may display a status of the controller 204 and/or other system element status, measurements of sensors 206, such as a pressure reading and/or a status of pressure cylinder assembly 202, and/or the like.

Power supply 201 may be in electronic communication with and/or configured to supply power to any of controller 204, sensors 206, gateway 208, cabin management system 212, cabin device 214, evacuation readiness system 220, and/or evacuation readiness device 222. Power supply 201 may be configured to be controlled by controller 204 in response to commands from controller 204.

In various embodiments, customer system 216 may be configured as a central network element or hub to access various systems, engines, and components of system 200. Customer system 216 may comprise a network, computer-based system, and/or software components configured to provide an access point to various systems, engines, and components. Customer system 216 may be in operative and/or electronic communication with controller 204, sensors 206, cabin management system 212, cabin device 214, evacuation readiness system 220, evacuation readiness device 222, and/or customer device 218 via gateway 208. In this regard, customer system 216 may allow communication from customer device 218 to systems, engines, and components of system 200. In various embodiments, customer system 216 may receive data 224 comprising real-time pressure readings associated with pressure cylinder assembly 202 from controller 204. In various embodiments, data 224 may include other operational data such as, for example, minimum pressure data for pressure cylinder assembly 202, pressure cylinder overhaul dates, safing pin status, service life expiration date data, and the like. Customer system 216 may be configured to store and maintain data relating to aircraft 10 such as, for example, pressure history data. Customer system 216 may store the data 224 using any suitable technique described herein or known in the art. In various embodiments, customer system 216 may include a cloud based machine learning system.

Customer device 218 may comprise software and/or hardware in communication with customer system 216 via a network comprising hardware and/or software configured to allow an aircraft operator, a user, and/or the like, access to customer system 216. Customer device 218 may comprise any suitable device that is configured to allow a user to communicate with a network and customer system 216. Customer device 218 may include, for example, a personal computer, servers, pooled servers, laptops, notebooks, hand held computers, personal digital assistants, cellular phones, smart phones (e.g., an IPHONE® device, a BLACKBERRY® device, an ANDROID® device, etc.), tablets, wearables (e.g., smart watches and smart glasses), Internet of Things (IOT) devices, or any other device capable of receiving data over network and/or the like and may allow a user to transmit a request to view pressure cylinder assembly data.

Gateway 208 may be in electronic communication with controller 204 and customer system 216. Gateway 208 may comprise hardware and/or software configured as a communications interface which allows software and data to be transferred between aircraft 10 and external devices. Examples of communications interfaces may include a modem, a network interface (such as an Ethernet card), a communications port, BLUETOOTH®, TCP/IP, or near field communications (NFC), wifi and other radio frequency (RF) forms of communication and/or the like. In various embodiments, gateway 208 may be an internet of things (IoT) gateway in communication with a cloud based machine learning system. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a RF link, wireless and other communications channels. The system may include or interface with any of the foregoing accounts, devices, and/or a transponder and reader (e.g., RFID reader) in RF communication with the transponder (which may include a fob), or communications between an initiator and a target enabled by NFC. Typical devices may include, for example, a key ring, tag, card, cell phone, wristwatch, or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

In various embodiments, evacuation readiness system 220 may be configured as a network element or hub to access various systems, engines, and components of system 200. Evacuation readiness system 220 may comprise a network, computer-based system, and/or software components configured to determine an evacuation system readiness. Evacuation readiness system 220 may be in operative and/or electronic communication with controller 204 and sensors 206. In various embodiments, evacuation readiness system 220 may receive data 226 comprising real-time pressure readings associated with pressure cylinder assembly 202 from controller 204. In various embodiments, data 226 may include other operational data such as, for example, minimum pressure data for pressure cylinder assembly 202, pressure cylinder overhaul dates, safing pin status, service life expiration date data, and the like. Evacuation readiness system 220 may be configured to store and maintain data relating to aircraft 10 such as, for example, pressure history data. Evacuation readiness system 220 may store the data 226 using any suitable technique described herein or known in the art. In various embodiments, evacuation readiness system 220 may include a cloud based machine learning system. "A cloud based machine learning system," as describe herein, refers to a system configured to recognize patterns and computational learning, such as reprogramming the evacuation readiness system 220 based on patterns recognized in the data 226 and other computational learning.

Figure 3:
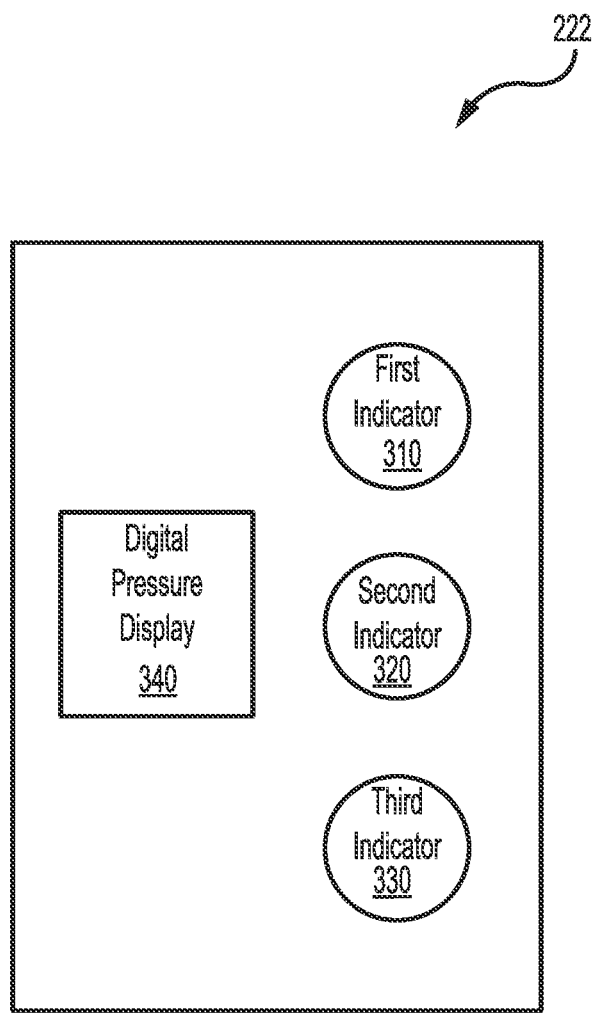
FIG. 3 illustrates an evacuation system readiness device, in accordance with various embodiments.

Evacuation readiness device 222 may comprise software and/or hardware in communication with evacuation readiness system 220 via a network comprising hardware and/or software configured to allow identify an evacuation system readiness visually. With brief reference to FIG. 3, an evacuation readiness device 222, in accordance with various embodiments, is depicted. The evacuation readiness device 222 may comprise a first indicator 310, a second indicator 320, and a third indicator 330. Each indicator (310, 320, 330) may comprise a lighting source like lamp, light emitting diode (LED), Organic LEDs, Laser etc. The first indicator 310 may comprise a first color, such as green, and may indicate when the evacuation system is ready. The second indicator 320 may comprise a second color, such as yellow, and may indicate when the evacuation system is due for service soon. The third indicator 330 may comprise a third color, such as red, and may indicate when the evacuation system is currently due for service. The evacuation readiness device 222 may allow the visual indication of system readiness separate from a location of pressure measurement and/or offer expanded health/maintenance monitoring capability and/or improve reliability in evacuation systems.

In various embodiments, the evacuation readiness device 222 may further comprise a digital pressure display 340. The digital pressure display 340 may indicate the current pressure of the pressure cylinder assembly 202. In various embodiments, the digital pressure display 340 may be configured to indicate a number of days until service due when the second indicator is displayed. In various embodiments, the digital pressure display 340 may be configured to display an alert when a service is due immediately.

Figure 6:
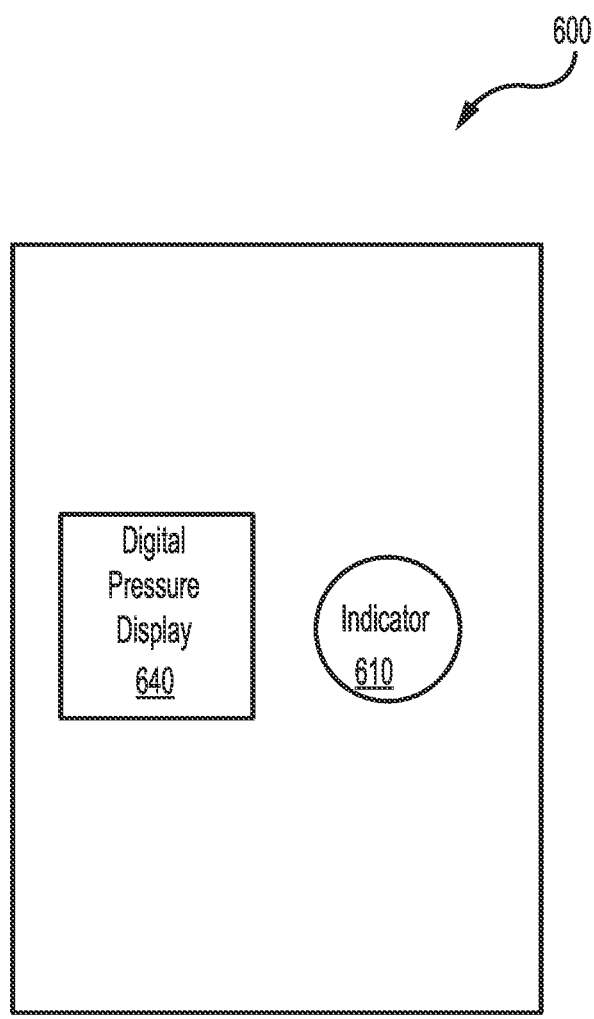
FIG. 6 illustrates an evacuation system readiness device, in accordance with various embodiments.

With reference now to FIG. 6, an evacuation readiness device 600, in accordance with various embodiments, is illustrated. The evacuation readiness system comprises an indicator 610 and/or a digital pressure display 640. The indicator 610 may comprise a lighting source like lamp, light emitting diode (LED), Organic Light Emitting Diodes (OLEDs), Laser, or the like configured to display various colors based on a system readiness. For example, indicator 610 may display green when the evacuation system is ready, the indicator 610 may display yellow when the evacuation system is due for service soon, and the indicator 610 may display red when the evacuation system is due for service immediately. The digital pressure display 640 may be in accordance with digital pressure display 340 as outlined above.

Figure 4:
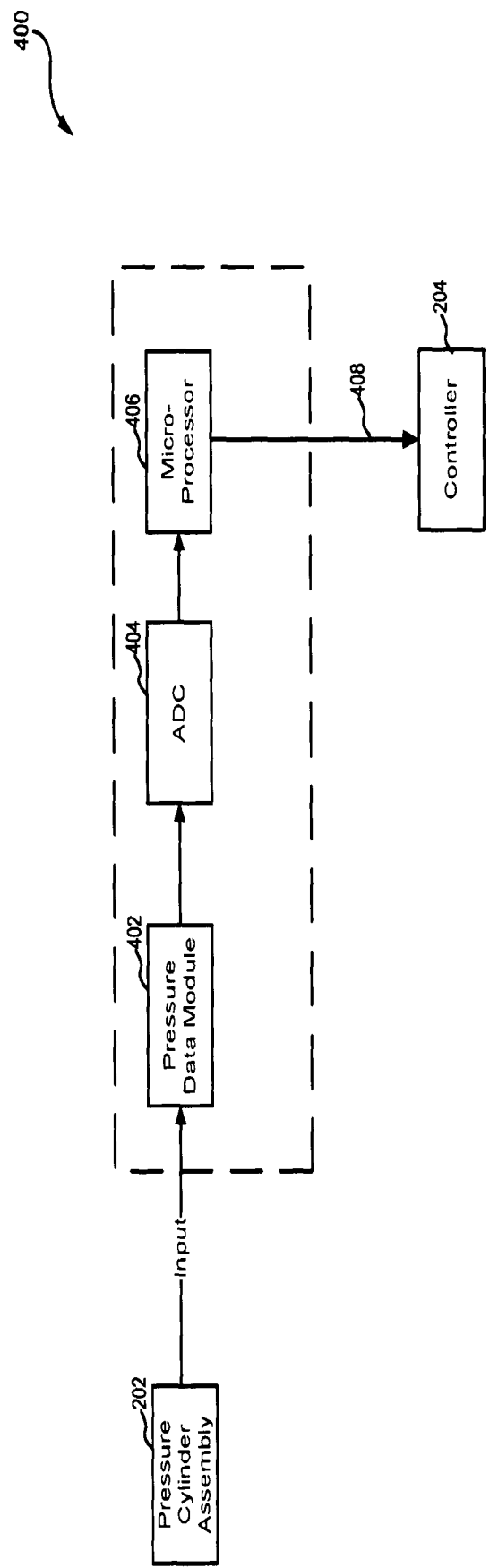
FIG. 4 illustrates a block diagram of a digital pressure sensor in an evacuation system health monitoring system, in accordance with various embodiments.

In various embodiments and with additional reference to FIG. 4, a block diagram of digital pressure sensor 400 of sensors 206 is illustrated. Digital pressure sensor 400 may comprise a pressure data module 402, an analog to digital converter (ADC) 404, a microprocessor 406, and a digital output signal 408. The pressure data module 402 may receive pressure data from pressure cylinder assembly 202 and supply the pressure data to the ADC 404. The ADC 404 may convert the pressure data from the pressure data module 402 from an analog signal to a digital signal and supply the digital data to the microprocessor 406. Microprocessor 406 may be a general purpose processor, a digital signal processor (DSP), an application specific integrated circuit (ASIC), a field programmable gate array (FPGA) or other programmable logic device, discrete gate or transistor logic, discrete hardware components, or any combination thereof. Microprocessor 406 may be configured to implement various logical operations in response to execution of instructions, for example, instructions stored on a non-transitory, tangible, computer-readable medium configured to communicate with controller 204. The microprocessor 406 may then supply the data as a digital output signal 408 for a controller, such as controller 204.

Figure 5:
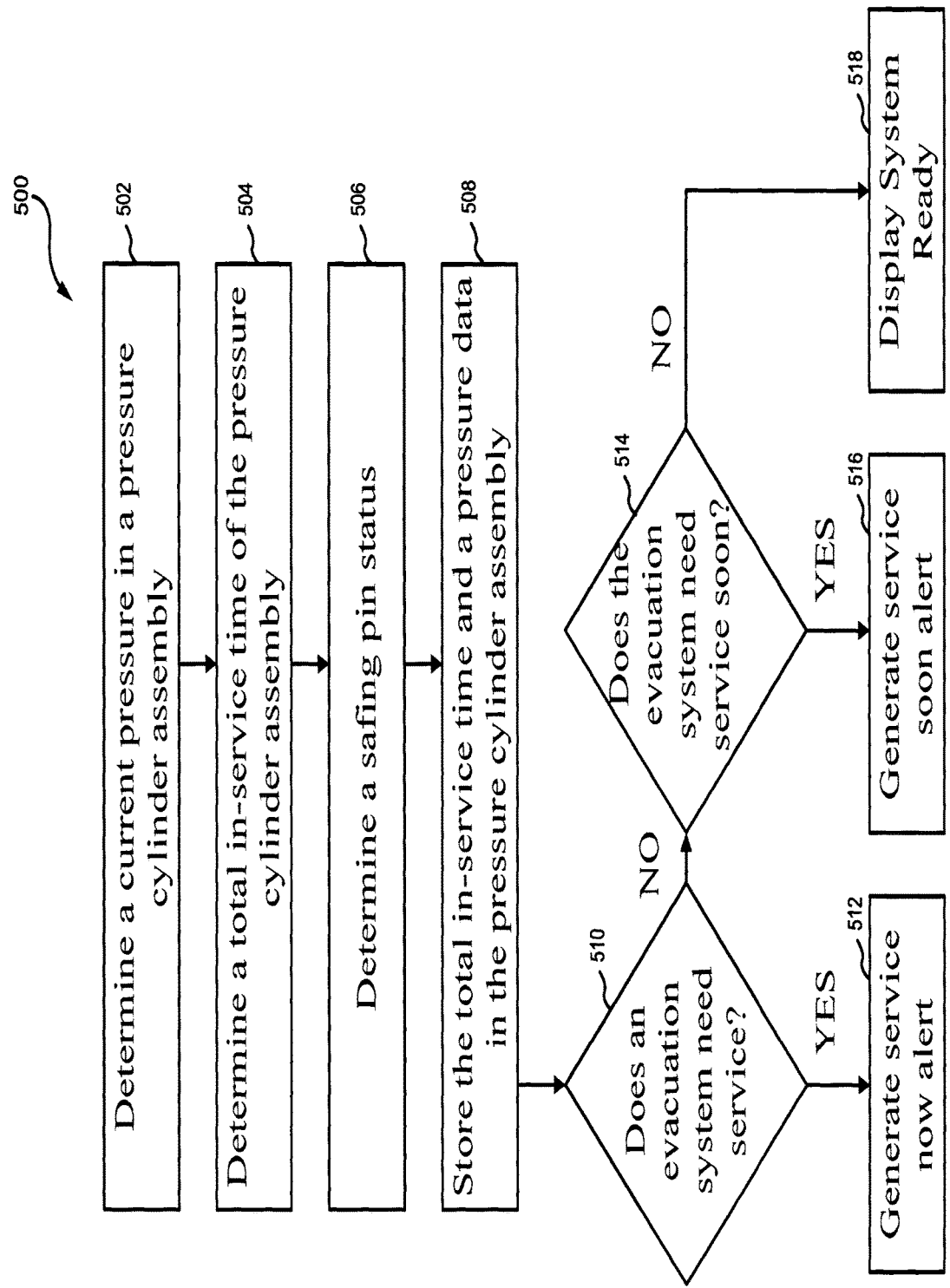
FIG. 5 illustrates a process flow in an evacuation readiness system, in accordance with various embodiments.

In various embodiments and with additional reference to FIG. 5, a process flow 500 in an aircraft evacuation system health monitoring system 200 is illustrated. The system may determine a current pressure in a pressure cylinder assembly (step 502). For example, digital pressure sensor 400 of sensors 206 may provide a current pressure reading to controller 204 and communicate the current pressure reading to customer system 216, cabin management system 212, and/or evacuation readiness system 220. The system may determine a total in-service time of the pressure cylinder assembly (step 504). For example, controller 204 may determine the total in-service time of the pressure cylinder assembly 202 from a time the power supply 201 is turned on or from a time the controller 204 and/or power supply 201 is/are reset. The system may determine a safing pin status of a triggering system of the evacuation system (step 506). For example, a safing pin sensor in sensors 206 may determine whether the safing pin is inadvertently left installed in the triggering mechanism. In various embodiments, customer system 216, evacuation readiness system 220, and/or cabin management system 212 may determine whether pressure is decreasing at a specific rate over time. This may indicate that a safing pin is faulty and may be utilized in addition to or in place of a safety position sensor.

In various embodiments, the system may store the total in-service time and a pressure data in the pressure cylinder assembly (step 508). For example, controller 204 may store the total in-service time and the pressure data, or customer system 216, evacuation readiness system 220, and/or cabin management system 212 may store the total in-service time and the pressure data.

In various embodiments, controller 204, customer system 216, evacuation readiness system 220, and/or cabin management system 212 may determine if an evacuation system needs service based on a total operating time exceeding a service threshold, based on a current pressure dropping below a minimum bottle threshold, and/or based on a safing pin being inadvertently left installed (step 510). In various embodiments, controller 204, customer system 216, cabin management system 212, and/or evacuation readiness system 220 may compare the current pressure to a minimum bottle pressure threshold during step 510. In various embodiments, controller 204, customer system 216, cabin management system 212, and/or evacuation readiness system 220 may compare the total operating time to a service threshold during step 510.

In various embodiments, if the evacuation system needs service, the system may generate a service due now alert (step 512). For example, evacuation readiness system 220 may generate a service due now alert to evacuation readiness device 222. In response to the service due now alert, evacuation readiness device 222 may activate third indicator 330, indicating a service of the evacuation system is due now. In various embodiments, activating third indicator 330 may result in a red led light being turned on and/or flashing. In various embodiments, cabin management system 212 may generate a service due now alert to cabin device 214, and/or customer system 216 may generate a service due now alert to customer device 218. In various embodiments, a service due now alert by cabin device 214 and/or customer device 218 may be in the form of an email alert, a text alert, an on-screen alert, or the like.

In various embodiments, if the evacuation system does not need service immediately, controller 204, customer system 216, evacuation readiness system 220, and/or cabin management system 212 may determine if an evacuation system needs service soon based on a total operating time nearing a service threshold and/or based on a current pressure dropping near a minimum bottle threshold (step 514). In various embodiments, controller 204, customer system 216, cabin management system 212, and/or evacuation readiness system 220 may compare the current pressure to a minimum bottle pressure threshold during step 514 and calculate a duration until service is needed based on an average loss of pressure over time, the current pressure, and the minimum bottle pressure. For example, if a minimum bottle pressure is 30 psi, the current pressure is 32 psi, and the pressure is decreasing at a rate of 2 psi per 30 days, an expected service day would be in 30 days. In various embodiments, controller 204, customer system 216, cabin management system 212, and/or evacuation readiness system 220 may compare the in service time of the pressure cylinder assembly 202 to the service threshold from step 510.

In various embodiments, a pressure cylinder assembly 202 is near service if it is within a predetermined near service threshold. For example, a near service threshold may be 30 days until service is needed, or 20 days until service is needed, or a week until service is need, or the like. In various embodiments, the near service threshold may be configurable constants stored in customer system 216, evacuation readiness system 220, and/or cabin management system 212.

In various embodiments, the system may generate a service due soon alert based on the in-service time being within the near service threshold to the service threshold or an expected service threshold (step 516). For example, a service threshold may be a constant programmable service date determined by the manufacturer, and an expected service threshold may be calculated as outlined with respect to step 514. The evacuation readiness system 220 may generate a service due soon alert to evacuation readiness device 222. In response to the service due soon alert, evacuation readiness device 222 may activate second indicator 320, indicating a service of the evacuation system is due soon. In various embodiments, activating second indicator 320 may result in a yellow LED light being turned on and/or flashing. In various embodiments, cabin management system 212 may generate a service due soon alert to cabin device 214, and/or customer system 216 may generate a service soon alert to customer device 218. In various embodiments, a service due soon alert by cabin device 214 and/or customer device 218 may be in the form of an email alert, a text alert, an on-screen alert, or the like.

In various embodiments, if the evacuation system does not need service soon, controller 204, customer system 216, evacuation readiness system 220, and/or cabin management system 212 may display the evacuation system is ready (step 518). For example, the evacuation readiness system 220 may generate an evacuation system is ready signal to evacuation readiness device 222. In response to the signal, evacuation readiness device 222 may activate first indicator 310, indicating the evacuation system is ready. In various embodiments, activating first indicator 310 may result in a green LED light being turned on and/or flashing. In various embodiments, cabin management system 212 may send an evacuation system is ready signal to cabin management device 214, and/or customer system 216 may send an evacuation system is ready signal to customer device 218. In various embodiments, an evacuation system is ready display by cabin device 214 and/or customer device 218 may be in the form of a signal on the screen, or the like.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); JAVA® 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of monitoring an evacuation system of an aircraft, comprising:
   receiving, by a processor, a current pressure reading of a pressure cylinder assembly from a digital pressure sensor;
   receiving, by the processor, data regarding in-service time for the pressure cylinder assembly;
   determining, by the processor and based on the data, a total in-service time of the pressure cylinder assembly; and
   generating, by the processor, an alert selected from a group consisting of service due now, service due soon, and evacuation system ready, wherein:
      the alert is generated on an evacuation readiness device comprising a visual indication of system readiness,
      service due now is displayed as a first color,
      service due soon is displayed as a second color, and
      evacuation system ready is displayed as a third color,
      the first color, the second color, and the third color are all different.

2. The method of claim 1, further comprising comparing the in-service time to a service time threshold, wherein the alert is service due now when the total in-service time exceeds the service time threshold or when the current pressure reading is less than a minimum pressure threshold for the pressure cylinder assembly.

3. The method of claim 2, wherein the alert is service due soon when the total in-service time is within a near service threshold of the service time threshold.

4. The method of claim 2, further comprising storing, by the processor, the total in-service time and the current pressure reading resulting in a pressure data as a function of time.

5. The method of claim 4, further comprising determining, by the processor, an average rate of pressure decreasing over time based on the pressure data.

6. The method of claim 5, further comprising calculating, by the processor, an expected service date based on the average rate of pressure decreasing over time and the minimum pressure threshold for the pressure cylinder assembly.

7. A health monitoring system of an aircraft evacuation system, comprising:
   a controller;
   a digital pressure sensor in electronic communication with the controller;
   a customer device in electronic communication with the controller via a customer system;
   an evacuation system readiness device in electronic communication with the controller; and
   a tangible, non-transitory memory configured to communicate with the controller, the tangible, non-transitory memory having instructions stored thereon that, in response to execution by the controller, cause the controller to perform operations comprising:
      receiving, by the controller, a pressure data including a current pressure reading of a pressure cylinder assembly from the digital pressure sensor;
      receiving, by the controller, data regarding in-service time for the pressure cylinder assembly;
      determining, by the controller, a total in-service time of the pressure cylinder assembly; and
      generating, by the controller, an alert selected from a group consisting of service due now, service due soon, and evacuation system ready, wherein:

the customer device is configured to display the pressure data in real-time during operation of an aircraft, the alert is generated on the evacuation system readiness device, the evacuation system readiness device further comprises a visual indication of system readiness, service due now is displayed as a first color, service due soon is displayed as a second color, evacuation system ready is displayed as a third color, and the first color, the second color, and the third color are all different.

8. The health monitoring system of claim 7, wherein the alert is service due now when the total in-service time exceeds a service time threshold or when the current pressure reading is less than a minimum pressure threshold for the pressure cylinder assembly, and wherein the alert is displayed on at least one of the evacuation system readiness device and the customer device.

9. The health monitoring system of claim 8, wherein the alert is service due soon when the total in-service time is within a near service threshold of the service time threshold.

10. The health monitoring system of claim 8, wherein the operations further comprise storing, by the controller, the total in-service time and the current pressure reading resulting in the pressure data as a function of time.

11. The health monitoring system of claim 10, wherein the operations further comprise determining, by the controller, an average rate of pressure decreasing over time based on the pressure data.

12. The health monitoring system of claim 11, wherein the operations further comprise calculating, by the controller, an expected service date based on the average rate of pressure decreasing over time and the minimum pressure threshold for the pressure cylinder assembly.

13. A tangible, non-transitory computer-readable storage medium having instructions stored thereon that, in response to execution by a processor, cause the processor to perform operations comprising:

receiving, by the processor, a current pressure reading of a pressure cylinder assembly from a digital pressure sensor;

receiving, by the processor, data regarding in-service time for the pressure cylinder assembly;

determining, by the processor, a total in-service time of the pressure cylinder assembly; and generating, by the processor, an alert selected from a group consisting of service due now, service due soon, and evacuation system ready, wherein:

the alert is generated on an evacuation readiness device comprising a visual indication of system readiness, service due now is displayed as a first color, service due soon is displayed as a second color, evacuation system ready is displayed as a third color, and the first color, the second color, and the third color are all different.

14. The tangible, non-transitory computer-readable storage medium of claim 13, wherein the alert is service due now when the total in-service time exceeds a service time threshold or when the current pressure reading is less than a minimum pressure threshold for the pressure cylinder assembly.

15. The tangible, non-transitory computer-readable storage medium of claim 14, wherein the alert is service due soon when the total in-service time is within a near service threshold of the service time threshold.

16. The tangible, non-transitory computer-readable storage medium of claim 14, wherein the operations further comprise storing, by the processor, the total in-service time and the current pressure reading resulting in a pressure data as a function of time.

17. The tangible, non-transitory computer-readable storage medium of claim 16, wherein the operations further comprise:

determining, by the processor, an average rate of pressure decreasing over time based on the pressure data; and calculating, by the processor, an expected service date based on the average rate of pressure decreasing over time and the minimum pressure threshold for the pressure cylinder assembly.

* * * * *